April 30, 1963  J. D. HENDERSON  3,087,339
AUTOMATIC SAMPLER
Filed March 20, 1959  2 Sheets-Sheet 1
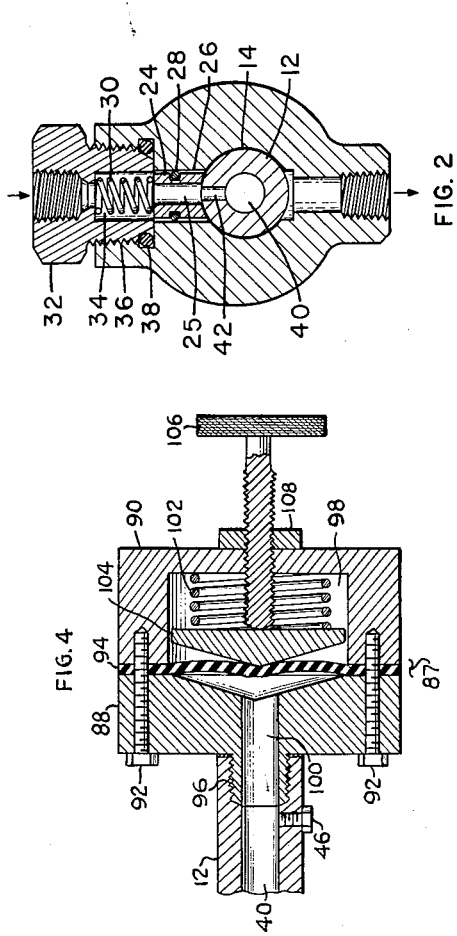
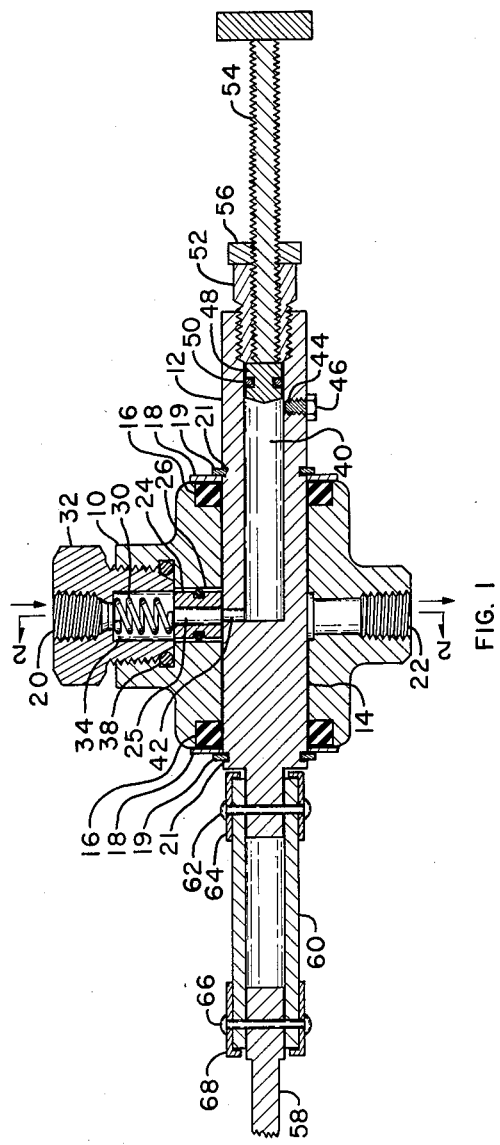
James D. Henderson  Inventor
By John D. Gassett  Attorney April 30, 1963    J. D. HENDERSON    3,087,339
AUTOMATIC SAMPLER
Filed March 20, 1959    2 Sheets-Sheet 2

James D. Henderson    Inventor
By John D. Gassett    Attorney 3,087,339
AUTOMATIC SAMPLER
James D. Henderson, Devon, Alberta, Canada, assignor to Jersey Production Research Company, a corporation of Delaware
Filed Mar. 20, 1959, Ser. No. 800,812
8 Claims. (Cl. 73—422)

The present invention relates to a device for obtaining samples from a fluid stream. It relates especially to a device for taking representative proportional samples from a flowing fluid.

In flowing fluids in confined streams, such as in pipelines, it is usually desired to know what fluid or fluids is flowing therein. A convenient way to determine the nature of the fluid is to take representative samples from the stream and subsequently analyze the samples. It is desired that the samples taken be representative of the fluid flowing and also that the amount of the sample taken be relatively small. Various automatic samplers have been devised. Although some of these samplers have proved fairly satisfactory, the volume of the sample taken is still too large. It is desired, then, that the amount of sample taken be reduced further. The sampler disclosed by this invention obtains samples, at any given sampling rate, which are much smaller in volume than that possible from other available samplers.

It is an object of the present invention to provide a device for taking a representative sampling from a fluid stream.

It is another object of the present invention to provide a device for automatically taking samples from a fluid stream which are representative of the fluids in the stream.

Other objects and advantages of the present invention will appear from the following description taken in conjunction with the accompanying drawing in which:

FIG. 1 is a longitudinal sectional view of a device according to the present invention;

FIG. 2 is a cross sectional view of the apparatus shown in FIG. 1 taken along the line 2—2;

FIG. 4 illustrates an adjustable spring loaded diaphragm which may be used with the apparatus of FIG. 1 for discharging fluid therefrom.

Figure 3:
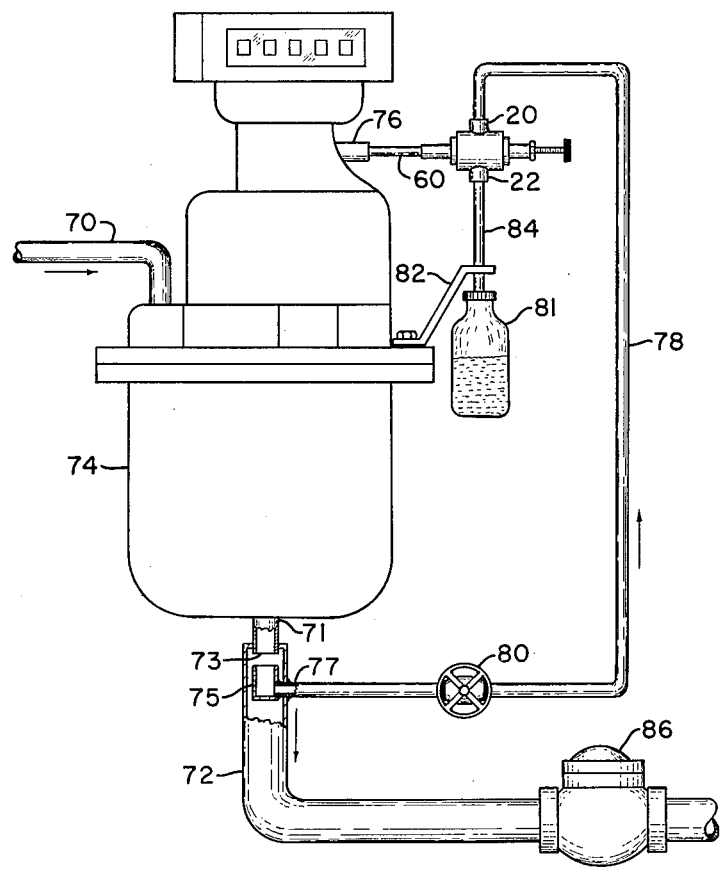
FIG. 3 is a schematic diagram, partly in section, illustrating the installation of the automatic sampler of this invention.

Referring to the drawings and especially FIGS. 1 and 2, it will be seen that the device comprises a housing 10 and a rotating shaft 12. Housing 10 is characterized by having an internal longitudinal passageway 14 which is of a size to rotationally receive shaft 12. Sealing means 16 are provided to form a seal between the internal wall of passageway 14 and the external wall of shaft 12. Sealing means 16 may be any conventional packing means such as garter spring type seal or U-cup seal. Sealing means 16 may conveniently be held in place by retaining rings 18.

Shaft 12 is held within passageway 14 by holding rings 19 which are placed in recesses 21. Holding rings 19 also hold retaining rings 18 firmly against seals 16.

Housing 10 is further characterized by having inlet port means 20 and outlet port means 22. Outlet port means 22 is spaced circumferentially about housing 10 from inlet port means 20. A seal to prevent leakage around the shaft 12 is provided by a spring loaded bushing 24 contoured to fit the shaft and mounted in a restricted portion 26 of inlet port means 20. Bushing 24 is also characterized by having a central passage 25. Bushing 24 is made of a tough, shape retaining material which is capable of sealing with shaft 12. Bushing 26 is preferably made of Teflon.

Sealing means 28 are provided between bushing 24 and the recessed portion 26. Sealing means 28 may be any conventional means such as an O-ring. A spring 30 is provided to load bushing 24 and hold it firmly against shaft 12. Retaining nut 32 has a passageway 34 adapted to receive a spring 30 and upon assembly to hold spring 30 in compression against bushing 24. Inlet port means 20 includes central passage 25 of bushing 24 and passageway 34 of retaining nut 32. Nut 32 is threadably attachable to housing 10 by thread means 36. Sealing means such as O-ring 38 is provided between nut 32 and housing 10.

Shaft 12 is provided with an internal chamber 40. A conduit or port 42 provides fluid communication between chamber 40 and the exterior of shaft 12. When the shaft 12 is in one position, port 42 is aligned with inlet port means 20. When shaft 12 is rotated to a second angular position, port 42 is aligned with outlet port means 22. Inlet port means 20 and outlet port means 22 are spaced from each other so that port 42 will not be in communication with both inlet port means 20 and outlet port means 22 at the same time.

Shaft 12 is provided with purging port 44 which establishes fluid communication between the interior chamber 40 and the exterior of the shaft. A plug 46 closes purging port 44. A piston plug 48 is fitted within internal chamber 40 and has seals 50, such as an O-ring, to provide a sealing fit between plug 48 and the wall of chamber 40. A piston plug retaining nut 52 is threadably attached to the end of shaft 12 and retains piston plug 48 within chamber 40. Piston plug retaining nut 52 has a threaded internal longitudinal passage through which adjusting screw 54 may be inserted. Adjusting screw 54 is used to position piston plug 48 within chamber 40 so as to adjust the volume of chamber 40. A lock nut 56 is provided on adjusting screw 54.

Shaft 12 is connected to a driving shaft means 58 by coupling 60. It is preferred that coupling 60 be flexible so as to reduce the exactness of the alignment of the drive shaft means 58 and shaft 12. Coupling 60 is connected to shaft 12 by pin 62 and sleeve 64. Coupling 60 is connected to drive shaft means 58 by pin 66 and sleeve 68.

Attention is next directed to FIG. 3 which shows an installation of the automatic sampler. Meter 74 is provided with a main inlet conduit 70 and a fluid discharge line 72. Meter 74 is characterized by having a power takeoff 76 which is attachable to coupling 60. Reference numeral 74 may represent any suitable device in which the rate of rotation of power take-off means 76 is directly proportional to the rate of flow of the fluid. A suitable meter is manufactured and sold by the A. O. Smith Company with a factory at 5715 Smithway Street, Los Angeles 22, California. A suitable meter is designated by that company as an "S" meter with a cable drive transmitter #501123.

A sampling T arrangement is illustrated in FIG. 3 and includes meter outlet 71 having nozzle 73 and a sampling cone or probe 75 spaced from nozzle 73. Conduit 77 fluidly connects probe 75 with sample flow line 78. The outside diameter of probe 75 and nozzle 73 are less than the inside diameter of discharge line 72. The upstream opening of probe 75 is preferably the same size as the opening of nozzle 73. The downstream opening of probe 75 is of a reduced diameter from the diameter of the upstream opening. This sampling T permits a representative sample to be obtained when there are two or more free or separate fluids flowing in a common line.

Sample flow line 78 having valve 80 connects fluidly conduit 77 with inlet port means 20 of the automatic sampler. Sample flow line 78 has a very small diameter and is kept very short in length. This prevents any appreciable amount of fluid being stored in the flow line and subsequent delay in the sampling of the fluid stream. In other words, the sample obtained is representative of the flow of fluid through discharge line 72.

A sample container 81 is supported from meter 74 by support member 82. Sample container 81 is connected to outlet port means 22 of the automatic sampler by conduit 84. Conduit 84 is used to support the automatic sampler from support member 82. Sample container 81 may or may not be vented to the atmosphere depending upon whether the content of any gas that may be in the stream is desired to be analyzed. A back pressure regulator 86 is provided in fluid discharge line 72 to maintain a constant pressure on meter 74 and the sampling means.

Having described the structural features of the automatic sampler shown in FIG. 1 and its installation shown in FIG. 3, attention is now directed briefly toward its operation. Fluid flowing into meter 74 through inlet conduit 70 will cause the recording mechanism of meter 74 to rotate. The power takeoff 76 rotates proportionally to the rate of flow through meter 74. Shaft 12 is rotated within body or housing 10 by power takeoff 76. Valve 80 is open so as to allow fluid to flow through sample flow line 78 to inlet port means 20 of the automatic sampler. As shaft 12 rotates, port 42 will, at one angular position in this rotation, be in communication with inlet port means 20. At this time fluid will flow into internal chamber 40. As shaft 12 continues to rotate port 42 will be removed from alignment with inlet port means 20. Upon further rotating of shaft 12, port 42 is aligned with outlet port means 22 and the contents of internal chamber 40 will be discharged through outlet port means 22 through conduit 84 into sampler container 81.

If it is assumed that the fluid being sampled in this example contains gas under pressure, then the expansive force of the gas in solution provides the energy for discharging the fluid from internal chamber 40. The sampling of so called "dead fluids" such as crude oil from storage tanks which contains very little gas will be discussed later.

Shaft 12 is coupled to power takeoff 76 which is connected to the metering mechanism of meter 74. The rotation of power takeoff 76 is directly proportional to the rate of flow of fluid through meter 74. It is thus seen that the rotation of shaft 12 is also directly proportional to the rate of flow of the fluid through meter 74. This assures that the samples taken are representative of the total fluid passing through the stream.

When sampling "dead fluid," that is fluid which does not contain any appreciable amount of gas dissolved therein, means must be provided for discharging or forcing the "dead fluid" from chamber 40. One such discharge means is shown in FIG. 4 which illustrates a known adjustable spring loaded diaphragm which is suitable for use with the automatic sampler of this invention when sampling "dead fluid." A diaphragm-holding housing 87 is made up of sections 88 and 90 which are connected by screws 92. Section 88 is threadably connected to shaft 12 at 96 and an internal cavity 98 is formed within diaphragm housing 87. A passageway 100 connects the cavity 98 with the internal chamber 40 of shaft 12. A diaphragm 94 is disposed between diaphragm-holding housing sections 88 and 90 in cavity 98. A spring 102 is disposed in cavity 98 and is urged against piston 104 which preferably has a conical surface positioned against diaphragm 94.

Adjusting screw 106 is provided for adjusting the position of piston 104 which in turn regulates the size sample to be taken for each revolution of shaft 12. Adjusting screw 106 is conveniently provided with locking nut 108.

The device illustrated in FIG. 4 is used primarily for sampling so called "dead fluids," that is fluids not containing gas in solution under pressure. The dead fluid enters the storage chamber 40 and being under pressure forces the diaphragm back against piston 104 which compresses spring 102. When shaft 12 rotates such that port 42 is opposite outlet port 22, spring 102 expands against piston 104 which forces diaphragm 94 toward chamber 40. This expels the fluid from chamber 40 through outlet port means 22 into sampling container 81.

While specific embodiments of the present invention have been disclosed, it is obvious that various modifications may be made without departing from the scope of the invention. It is intended that the scope of this invention be limited only by the following claims and not by the specific embodiments described herein.

I claim:

1. A device for removing fluid samples from a petroleum stream comprising a housing having a cylindrical passageway therein, said housing also having an inlet port means and an outlet port means circumferentially spaced therefrom, each such port means establishing fluid communication between said passageway and the exterior of said housing; a shaft sealingly and rotatably mounted within said cylindrical passageway, said shaft extending longitudinally beyond said cylindrical passageway, said shaft having an enclosed internal chamber, a purging port means in the part of the wall of said shaft exterior of said passageway and establishing fluid communication between said enclosed internal chamber and the exterior of the device, means to close said purging port means, said shaft also having port means extending from said internal chamber to the exterior of said shaft, said port means being radially aligned with said inlet passage and said outlet passage of said housing, said chamber being sealed from the exterior of said shaft except through said port means.

2. A device for removing samples from a fluid petroleum stream comprising a housing having a cylindrical passageway therethrough; said housing having an inlet passage and an outlet passage circumferentially spaced about said passageway and each such passage establishing fluid communication between said passageway and the exterior of said housing; a shaft insertable in said passageway in a sealingly and rotatable relationship therewith, said shaft having a bore extending therein from one end, said shaft also having a greater longitudinal dimension than said passageway and the end of said shaft having the opening of said bore extending beyond said passageway upon insertion of said shaft in said passageway; a port in the wall of said shaft establishing fluid communication between the bore of said shaft and the exterior thereof and said port being laterally aligned with the opening of said inlet and said outlet passage upon insertion of said shaft in said passageway; a piston plug sealingly insertable within said bore of said shaft; means to adjust the position of said piston plug within said bore of said shaft; and means for rotating said shaft.

3. An apparatus as defined in claim 2 including a port means in that part of said shaft not inserted within said passageway and establishing fluid communication between the bore of said shaft and the exterior thereof; and means to close said port means.

4. A device for obtaining fluid petroleum samples from a conduit in proportion to the amount of fluid flowing therein and in which metering means are provided and which metering means has a power take-off driven according to the amount of fluid metered; which comprises: a housing member, a hollow shaft closed at each end and mounted within said housing member in rotatable sealed relation, inlet port means and outlet port means in said housing member circumferentially spaced from each other relative to said hollow shaft, a port in the wall of said hollow shaft adapted to be in alignment with said inlet port means only when said shaft is in one angular position within said housing and in alignment with said outlet port means only when said shaft is in a second such angular position, adjusting means for adjusting the size of the hollow portion of said shaft, said adjusting means including a plug insertable axially in said hollow shaft and means for adjusting the position of such plug; and means connecting said shaft to the power take-off of the meter so that said shaft rotates proportionally to the amount of fluid being measured.

5. A device for obtaining fluid petroleum samples from a conduit in proportion to the amount of fluid flowing therein and in which metering means are provided and which metering means has a power take-off driven according to the amount of fluid metered; which comprises: a housing member, a hollow shaft closed at each end and mounted within said housing member in rotatable sealed relation, inlet port means and outlet port means in said housing member circumferentially spaced from each other relative to said hollow shaft, purge means for purging the hollow portion of said shaft, a port in the wall of said hollow shaft adapted to be in alignment with said inlet port means only when said shaft is in one angular position within said housing and in alignment with said outlet port means only when said shaft is in a second such angular position and means connecting said shaft to the power take-off of the meter so that said shaft rotates proportionally to the amount of fluid being measured.

6. A device for removing samples from a fluid petroleum stream which has a metering means thereon which comprises in combination: a power take-off on said metering means which rotates in proportion to the amount of fluid metered, a housing having a cylindrical passageway, said housing having an inlet passage and an outlet passage circumferentially spaced about said passageway, each such passage establishing fluid communication between said passageway and the exterior of said housing; a hollow shaft closed at each end and being sealingly and rotatably insertable within said passageway of said housing; port means within said shaft establishing fluid communication between the sample receiving chamber formed in the interior of said shaft and the exterior thereof and being laterally aligned with the opening of said inlet and said outlet passage; means for adjusting the size of said sample receiving chamber; and means for connecting said shaft to said power take-off.

7. A device for removing samples from a fluid petroleum stream which has a metering means thereon which comprises in combination: a power take-off on said metering means which rotates in proportion to the amount of fluid metered, a housing having a cylindrical passageway, said housing having an inlet passage and an outlet passage circumferentially spaced about said passageway, each such passage establishing fluid communication between said passageway and the exterior of said housing; a hollow shaft closed at each end and being sealingly and rotatably insertable within said passageway of said housing; port means within said shaft establishing fluid communication between the sample receiving chamber formed in the interior of said shaft and the exterior thereof and being laterally aligned with the opening of said inlet and said outlet passage; closable purging means for said sample receiving chamber, said purging means including a conduit establishing fluid communication between said chamber and the exterior of the device; and means for connecting said shaft to said power take-off.

8. A device for removing samples from a fluid petroleum stream which has a metering means thereon which comprises in combination: a power take-off on said metering means which rotates in proportion to the amount of fluid metered, a housing having a cylindrical passageway, said housing having an inlet passage and an outlet passage circumferentially spaced about said passageway, each such passage establishing fluid communication between said passageway and the exterior of said housing; a hollow shaft closed at each end and being sealingly and rotatably insertable within said passageway of said housing; port means within said shaft establishing fluid communication between the sample receiving chamber formed in the interior of said shaft and the exterior thereof and being laterally aligned with the opening of said inlet and said outlet passage; resilient means for forcing fluid from the hollow portion of said shaft; and means for connecting said shaft to said power take-off.

References Cited in the file of this patent

UNITED STATES PATENTS

| | | |
|---|---|---|
| 1,793,747 | Prentice | Feb. 24, 1931 |
| 2,450,715 | Campbell | Oct. 5, 1948 |
| 2,548,193 | Blum | Apr. 10, 1951 |
| 2,656,724 | Cox et al. | Oct. 27, 1953 |
| 2,834,515 | Lanyon | May 13, 1958 |